United States Patent

Richards

[11] Patent Number: 5,283,421
[45] Date of Patent: Feb. 1, 1994

[54] ELECTRIC APPLIANCE WITH SAFETY SWITCHING ARRANGEMENT

[75] Inventor: David A. Richards, Peakhurst, Australia

[73] Assignee: PNE Appliance Controls Pte. Ltd., Singapore, Singapore

[21] Appl. No.: 970,999

[22] Filed: Nov. 3, 1992

[51] Int. Cl.⁵ .............................................. A05B 1/02
[52] U.S. Cl. ................... 219/519; 219/508; 219/492; 219/518; 99/329 RT; 99/327
[58] Field of Search ............... 219/492, 493, 518, 519, 219/497, 501, 506, 505; 99/329 R, 329 RT, 328, 329 P, 327

[56] References Cited

U.S. PATENT DOCUMENTS

| | | | |
|---|---|---|---|
| 4,170,932 | 10/1979 | Lalancette | 219/502 |
| 4,245,148 | 1/1981 | Gisske et al. | 219/492 |
| 4,395,621 | 7/1983 | Parker | 219/492 |
| 4,755,656 | 7/1988 | Charlesworth et al. | 219/493 |
| 4,976,194 | 12/1990 | Kelterborn et al. | 219/411 |
| 5,094,154 | 3/1992 | Nopanen | 219/492 |

FOREIGN PATENT DOCUMENTS 621532 3/1992 Australia .

Primary Examiner—Mark H. Paschall
Attorney, Agent, or Firm—Gottlieb, Rackman & Reisman

[57] ABSTRACT

When a carriage of the toaster is in a lower position, a switch (21) is closed and power passes through a bridge rectifier circuit (22) to an integrated circuit (19), which, for the normal cooking operation, switches SCR (20) off so that a relay (7) is energised, switching switches (8) and (9) on to energise heating elements (2) and (3). Power is also supplied to a latch (27) to hold the carriage in the lower position. If, however, a fault detection is input from a residual core balance (12) to the integrated circuit (19), SCR (20) is switched on so that power from bridge rectifier (22) is shorted. This causes relay (7) and latch (27) to be de-energised so that the heating elements (2) and (3) are turned off and the carriage is returned to the upper position, causing switch (21) to open.

14 Claims, 2 Drawing Sheets

ELECTRIC APPLIANCE WITH SAFETY SWITCHING ARRANGEMENT

BACKGROUND OF THE INVENTION

This invention relates generally to electrical appliances, and more particularly to electric toasters having a movable carriage for receiving bread to be cooked and movable between a lower position in which power is supplied to heating elements in the toaster to cook the bread and an upper position in which power is shut off from the heating elements.

As is well known, such toasters are susceptible to jamming, where the movable carriage remains in the lower position even when it should have moved to the upper position. This results in the power remaining connected to the heating elements, since movement of the carriage causes the disconnection, with the consequent dangers of fire and electrocution if, as often happens a person attempts to "unjam" the carriage using a knife, fork or other metal implement.

In order to try to obviate these dangers, it is known to provide circuit breakers, either within the appliance or as an extra device fitted between the appliance and the power supply, which sense leakage of current from the appliance, for example by,,,being conducted to earth by a person contacting the heating elements using a metal implement, and immediately cut off the power to the appliance.

However, in such a case, or if there occurs a power failure while the carriage is in the lower position, the carriage will remain in that position as its release is controlled by a solenoid. This results in the possibly unexpected energisation of the appliance when the power supply is reconnected.

BRIEF SUMMARY OF THE INVENTION

It is therefore an object of the present invention to provide an electric appliance which overcomes, or at least reduces, the above mentioned disadvantages of the prior art.

Accordingly, the invention provides an electric appliance having a carriage member movable between a first position and a second position, relay means for energising heating means in the appliance, positioning means for positioning the carriage member in the first position, sensing means for sensing when the member is in the first position, fault detection means for detecting a fault in the appliance, and control means coupled to the sensing means, the fault detecting means, the relay means and the positioning means for controlling the relay means to energise the heating means only when said sensing means senses that the member is in said first position and said fault detecting means does not detect any faults, and for controlling the relay means and the positioning means to de-energise the heating means and to move the member from the first position to the second position when the fault detecting means detects a fault.

In a preferred embodiment, the appliance is an electric toaster and the carriage member is a carriage for receiving one or more slices of bread for toasting. The fault detecting means is preferably a residual core balance coupled to the heating means for detecting a current imbalance therein. The relay means is conveniently electromagnetic and preferably a double pole switch, each pole being coupled in series in a power line leading to the heating means.

In a preferred embodiment, the positioning means comprises a hold means, preferably an electromagnetic latch, for holding the carriage member in the first position, and biasing means for moving the carriage member to the second position.

Preferably, the control means comprises processing means having one input coupled to the sensing means, a second input coupled to tile fault detecting means and an output coupled to a first switch means coupled to the relay means and the positioning means. The first switch means is preferably a silicon controlled rectifier (SCR). The sensing means preferably comprises a second switch means arranged to move between a closed position when the member is in the first position and an open position when the member is not in the first position. When the switch means is in the closed position, power is passed to the processing means, which, in the absence of a fault detection, controls the first switch so that the relay means and the hold means are energised.

In a preferred embodiment, the control means further comprises timing means for timing a predetermined period of time during which the heating means is energised and, at the end of the predetermined period, controlling the relay means and the positioning means to de-energise the heating means and to move the member from the first position.

BRIEF DESCRIPTION OF THE DRAWINGS

One embodiment of an electric toaster according to the present invention will now be more fully described, by way of example, with reference to the drawings, of which.

DETAILED DESCRIPTION OF THE DRAWINGS

Figure 1:
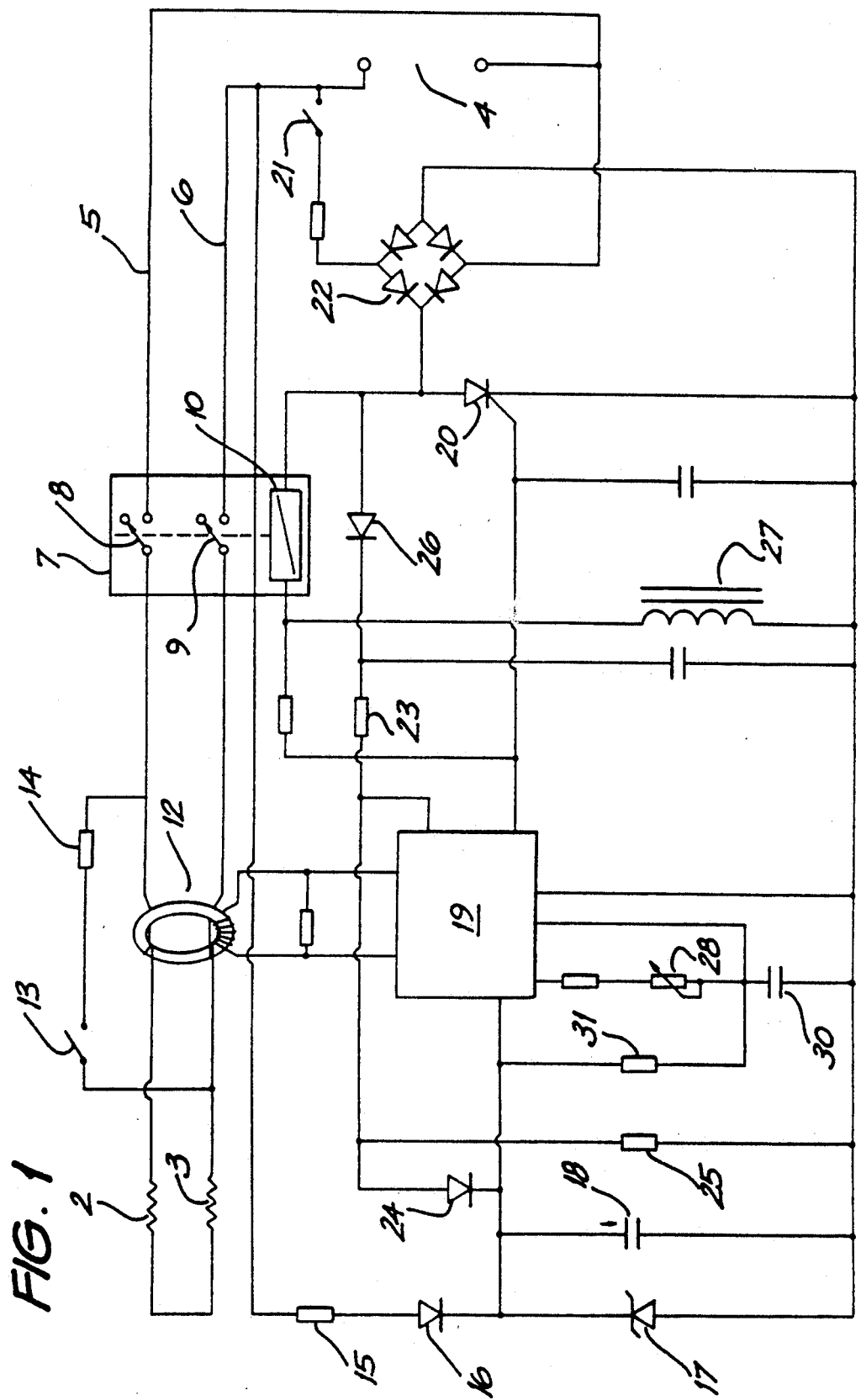
FIG. 1 is a schematic diagram of an electrical circuit forming part of the toaster incorporating the present invention.

Thus, as shown in the drawings, an electric toaster includes a pair of heating elements 2 and 3 arranged around a cavity in the body (not shown) of the toaster to cook bread or other food materials placed in a carriage (also not shown) and moved into the cavity. The heating elements 2 and 3 are supplied with power from a power supply 4 via power lines 5 and 6. Each of the power lines 5 and 6 is switched by a relay 7 to energise and de-energise the heating elements 2 and 3. Relay 7 is a double pole relay having a first switch 8 in power line 5 and a second switch 9 in power line 6 and electromagnetic actuating means 10 arranged to switch the switches 8 and 9 between their on and off positions.

Power lines 5 and 6 also pass through a residual core balance 12 which senses when the current in the two lines is unequal and therefore when current is leaking to earth, as, for example, if a person is being electrocuted, or due to other faults.

A test switch 13, and associated resistance 14 are provided across power lines 5 and 6 on either side of residual core balance 12 so that the operation of the residual core balance can be tested.

Power supply 4 is also coupled via components 15, 16, 17 and 18 to provide power to an integrated circuit 19. Integrated circuit 19 is provided with inputs from the residual core balance 12, indicating when there is a fault and an output controlling a silicon controlled rectifier (SCR) 20. A further input to integrated circuit 19 is provided from a switch 21 which is dependent on the position of the carriage of the toaster. The switch 21 is coupled to the input of integrated circuit 19 via a bridge rectifier circuit 22, a diode 26 and a voltage interface formed by components 23, 24 and 25.

Relay actuating means 10 is coupled between the output of integrated circuit 19 and the bridge rectifier circuit 22. An electromagnetic latch formed by an inductance 27 is coupled to the output of integrated circuit 19.

Thus, when the carriage of the toaster is in the lower position, switch 21 is closed and the power passes through bridge rectifier circuit 22. The fact that the carriage is in the lower position is therefore input to integrated circuit 19, which, for the normal cooking operation, switches SCR 20 off so that relay 7 is energised, switching switches 8 and 9 on to energise heating elements 2 and 3. Power is also supplied to inductance 27 to hold the carriage in the lower position. If, however, a fault detection is input from residual core balance 12 to the integrated circuit 19, SCR 20 is switched on so that power from bridge rectifier 22 is shorted. This causes relay 7 and inductance 27 to be de-energised so that the heating elements 2 and 3 are turned off and the carriage is returned to it's upper position, causing switch 21 to open. It will be appreciated, however, that even if the carriage is jammed in its lower position, i.e. switch 21 remains on, the relay 10, and consequently heating elements 2 and 3, will nevertheless be de-energised, since SCR 20 is on. Thus, both the relay and the electromagnetic latch are switched off when a fault is detected, independent of the carriage position.

It will be appreciated that pushing switch 13 during a cooking operation will automatically produce a fault signal and therefore cause the de-energisation of both relay 10 and inductor 27.

In order to provide control of the cooking time of the toaster, a potentiometer 28 is provided coupled to integrated circuit 19. The potentiometer 28 is set by the user to provide a particular cooking time and at the end of this period the integrated circuit 19 turns SCR 20 on so that relay 10 and inductance 27 are de-energised. If, however, fresh bread is immediately placed into the toaster and the toaster activated, then the heating elements 2 and 3 are still hot and therefore the bread would not require the same cooking period as when the heating elements are cold.

Figure 2:
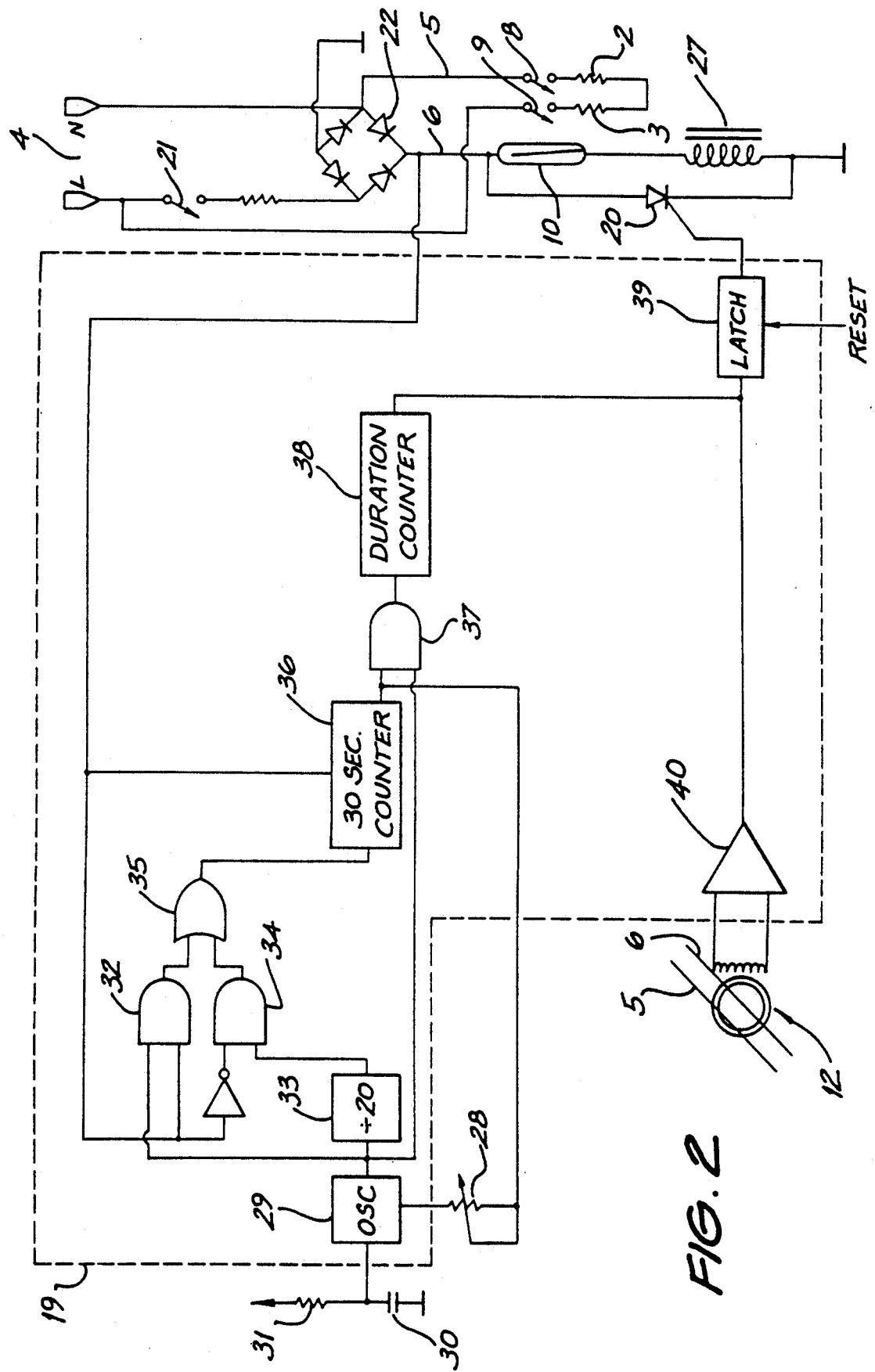
FIG. 2 is a schematic circuit diagram of a part of the circuit shown in FIG. 1 and including a schematic representation of part of the integrated circuit shown in FIG. 1.

In order to compensate for this, the toaster is also provided with a cooking duration compensation circuit. As best shown in FIG. 2, integrated circuit 19 is provided with an oscillator 29 powered via a capacitor 30 and resistor 31, also shown in FIG. 1, and having an input coupled to potentiometer 28. The output of the oscillator is passed to a first input of a first AND gate 32, whose second input is coupled to the output of bridge rectifier circuit 22, thereby providing an output when the carriage is in the lower position. The output of the oscillator 29 is also passed to a divider 33, which divides by 20, and whose output is passed to a first input of a second AND gate 34. The second input of the second AND gate 34 is coupled via an inverter to the second output of bridge rectifier circuit 22. The output of second AND gate 34 therefore provides an output only when the carriage of the toaster is in the upper position and the output is 20 times less frequent that the output of first AND gate 32. Outputs of AND gates 32 and 34 are passed via OR gate 35 to a 30 second counter 36. The counter 36 counts up or down depending on the output from bridge rectifier circuit 22, i.e. whether the carriage is in the upper or lower position.

Thus, when the carriage is in the lower position, i.e. in the cooking position, counter 36 is arranged to count down directly at the oscillator rate. When, however, the carriage is in the upper position, i.e. not cooking, the counter 36 is arranged to count up at the oscillator rate divided by 20. Thus, the counter can count up for a maximum of 10 minutes (30 seconds times 20). If the carriage is moved to the lower (cooking) position within that 10 minute period, then the counter 36 again counts down at the normal rate. It will be apparent, therefore, that if the toaster is turned off for 10 minutes or more, counter 36 will count for the full 30 seconds. However, if the toaster is off for less than 10 minutes, then counter 36 will have a reduced count (being 30t/10 sec. where t is the time in minutes for which the toaster is off), thus compensating for the heating elements not having cooled down completely.

The output of the 30 second counter 36 is passed to a first input of a third AND gate 37. The first input of third AND gate 37 is also coupled to potentiometer 28 and the second input of third AND gate 37 is coupled to the output of oscillator 29. Thus, the output of third AND gate 37 will provide a cooking time provided by the potentiometer 28 plus the output of 30 second counter 36. The cooking time will therefore be that provided by potentiometer 28 compensated by counter 36. The output of third AND gate 37 is passed to duration counter 38 which is coupled to an output latch 39, whose output controls SCR 20.

The input of latch 39 is also coupled, via amplifier 40 to the output of residual core balance 12 (shown schematically) so as to control SCR 20 in response to a fault being detected by residual core balance 12. A reset is also provided on latch 39.

It will be apparent that, although only one embodiment of a toaster according to the invention has been specifically described, various improvements and modifications can be made without departing from the scope of the present invention. For example, the cooking compensation can be carried out by any method and the movement of the carriage can be controlled in ways other than by using an electromagnetic latch. For example, a de-latching coil, rather than a latching coil could be used, as could other means for moving the carriage to the upper position.

What I claim is:

1. An electric appliance having heating means, a member movable between a first position and a second position, relay means for energizing said heating means, positioning means for positioning said member in said first position, sensing means for sensing when said member is in said first position, fault detecting means for detecting a fault in the appliance, and control means coupled to said sensing means, said fault detecting means, said relay means and said positioning means for controlling said relay means to energise said heating means only when said sensing means senses that said member is in said first position and said fault detecting means does not detect any faults, and, when said fault detecting means detects a fault, for controlling said relay means to de-energise said heating means and, independently, for controlling said positioning means to move said member from said first position to said second position.

2. An electric appliance according to claim 1, wherein the appliance is an electric toaster and said member is a carriage member for receiving one or more slices of bread for toasting.

3. An electric appliance according to either claim 1 or claim 2, wherein said detecting means is a residual core balance coupled to said heating means for detecting a current imbalance therein.

4. An electric appliance according to claim 1, wherein said means is electromagnetic.

5. An electric appliance according to claim 4, wherein said means comprises a double pole switch, each pole being coupled in series in a power line leading to said heating means.

6. An electric appliance according to claim 1, wherein the positioning means comprises a hold means for holding said member in said first position, and biasing means for moving said member to the second position.

7. An electric appliance according to claim 6, wherein said hold means comprises an electromagnetic latch.

8. An electric appliance according to claim 1, wherein the appliance further includes a first switch means coupled to said relay means and said positioning means, and said control means comprises processing means having one input coupled to said sensing means, a second input coupled to said fault detecting means, and an output coupled to said first switch means.

9. An electric appliance according to claim 8, wherein said first switch means is a silicon controlled rectifier (SCR).

10. An electric appliance according to claim 8, wherein said sensing means comprises a second switch means arranged to move between a closed position when said member is in said first position and an open position when said member is not in said first position, whereby, when said second switch means is in said closed position, power is passed to said processing means, which, in the absence of a fault detection, controls said first switch means so that said relay means and said hold means are energised.

11. An electric appliance according to claim 1, wherein said control means further comprises timing means for timing a predetermined period of time during which said heating means is energised and, at the end of said predetermined period, controlling said relay means and said positioning means to de-energised said heating means and to move said member from said first position.

12. An electric appliance according to claim 11, wherein said control means further comprises a timing compensation means for adjusting said predetermined period of time depending on how long the appliance has been deenergised.

13. An electric appliance according to claim 12, wherein said timing compensation means comprises a counter for counting down at a predetermined rate during which counting said heating means is energised, and for counting up at a rate different from said predetermined rate while said heating means is deenergised, such that if said counter counts up to a maximum value the compensated period for which said heating means is energised is a maximum, whereas if said counter counts up to a value less than the maximum value, the compensated period during which said heating means is energised is reduced by a corresponding value, said compensated period during which said heating means is energised being added to said predetermined period during which said heating means is energised.

14. An electric appliance according to claim 13, wherein the maximum value of said counter corresponds to a period of 10 minutes of said heating means being deenergised and to a period of 30 seconds of the heating means being energised.

* * * * *

UNITED STATES PATENT AND TRADEMARK OFFICE
CERTIFICATE OF CORRECTION

PATENT NO. : 5,283,421

DATED : February 1, 1994

INVENTOR(S) : David A. Richards

It is certified that error appears in the above-identified patent and that said Letters Patent is hereby corrected as shown below:

On the title page, between items [22] and [51], read:
-- [30] Foreign Application Priority Data

Oct. 26, 1992 [AU] Australia ............................27320/92 --.

Column 5, line 8, for "said detecting" read -- said fault detecting --; line 12, for "said means" read -- said relay means --; line 14, for "said means" read -- said relay means --; line 18, for "the" read -- said --; line 20, for "the" read -- said --.

Column 6, line 11, for "de-energised" read -- de-energise --; line 37, for "the" read -- said --.

Signed and Sealed this

Nineteenth Day of July, 1994

BRUCE LEHMAN

*Attest:*

*Attesting Officer*  *Commissioner of Patents and Trademarks*